(12) United States Patent
Perttula et al.

(10) Patent No.: US 12,093,028 B2
(45) Date of Patent: Sep. 17, 2024

(54) METHOD, AN APPARATUS, A SYSTEM, AND A COMPUTER PROGRAM PRODUCT FOR SUBSTANCE ANALYSIS

(71) Applicant: Fluid Intelligence Oy, Vaajakoski (FI)

(72) Inventors: Mika Perttula, Helsinki (FI); Eero Juustila, Oulu (FI); Mikko Oksanen, Jyväskylä (FI); Viktor Laitinen, Muurame (FI)

(73) Assignee: Fluid Intelligence Oy, Vaajakoski (FI)

( * ) Notice: Subject to any disclaimer, the term of this patent is extended or adjusted under 35 U.S.C. 154(b) by 134 days.

(21) Appl. No.: 17/476,254

(22) Filed: Sep. 15, 2021

(65) Prior Publication Data

US 2022/0083043 A1 Mar. 17, 2022

(30) Foreign Application Priority Data

Sep. 16, 2020 (FI) ...................................... 20205894

(51) Int. Cl.
*G05B 23/02* (2006.01)
*G06N 5/025* (2023.01)
*G06N 20/00* (2019.01)
*G06Q 10/20* (2023.01)

(52) U.S. Cl.
CPC ....... *G05B 23/0283* (2013.01); *G05B 23/024* (2013.01); *G06N 5/025* (2013.01); *G06N 20/00* (2019.01); *G06Q 10/20* (2013.01)

(58) Field of Classification Search
CPC .............. G05B 23/024; G05B 23/0221; G05B 23/0283; G06N 5/025; G06Q 10/20
See application file for complete search history.

(56) References Cited

U.S. PATENT DOCUMENTS

| 7,581,434 B1 * | 9/2009 | Discenzo ........... G01N 33/2888 73/53.01 |
| 2018/0225578 A1 | 8/2018 | Vyas et al. |
| 2019/0187679 A1 | 6/2019 | Strudwicke et al. |

OTHER PUBLICATIONS

Finnish Office Action issued in Application No. 20205894 on Apr. 12, 2021 (8 pages).
European Search Report of corresponding European application No. 21196842.5, issued Feb. 15, 2022, 4 pages.

* cited by examiner

*Primary Examiner* — Michael J Dalbo
*Assistant Examiner* — Kaleria Knox
(74) *Attorney, Agent, or Firm* — Meunier Carlin & Curfman LLC

(57) ABSTRACT

The embodiments relate to a solution for substance analysis in machine performance diagnostic, comprising: receiving a substance, said substance being obtained from a machine being inspected; detecting properties of the received substance by means of one or more sensors; transmitting information on the detected properties to an analytics module; performing a analysis on said detected properties according to predefined analysis rules; generating control instructions based on the analysis; and providing the control instructions as an output.

12 Claims, 7 Drawing Sheets

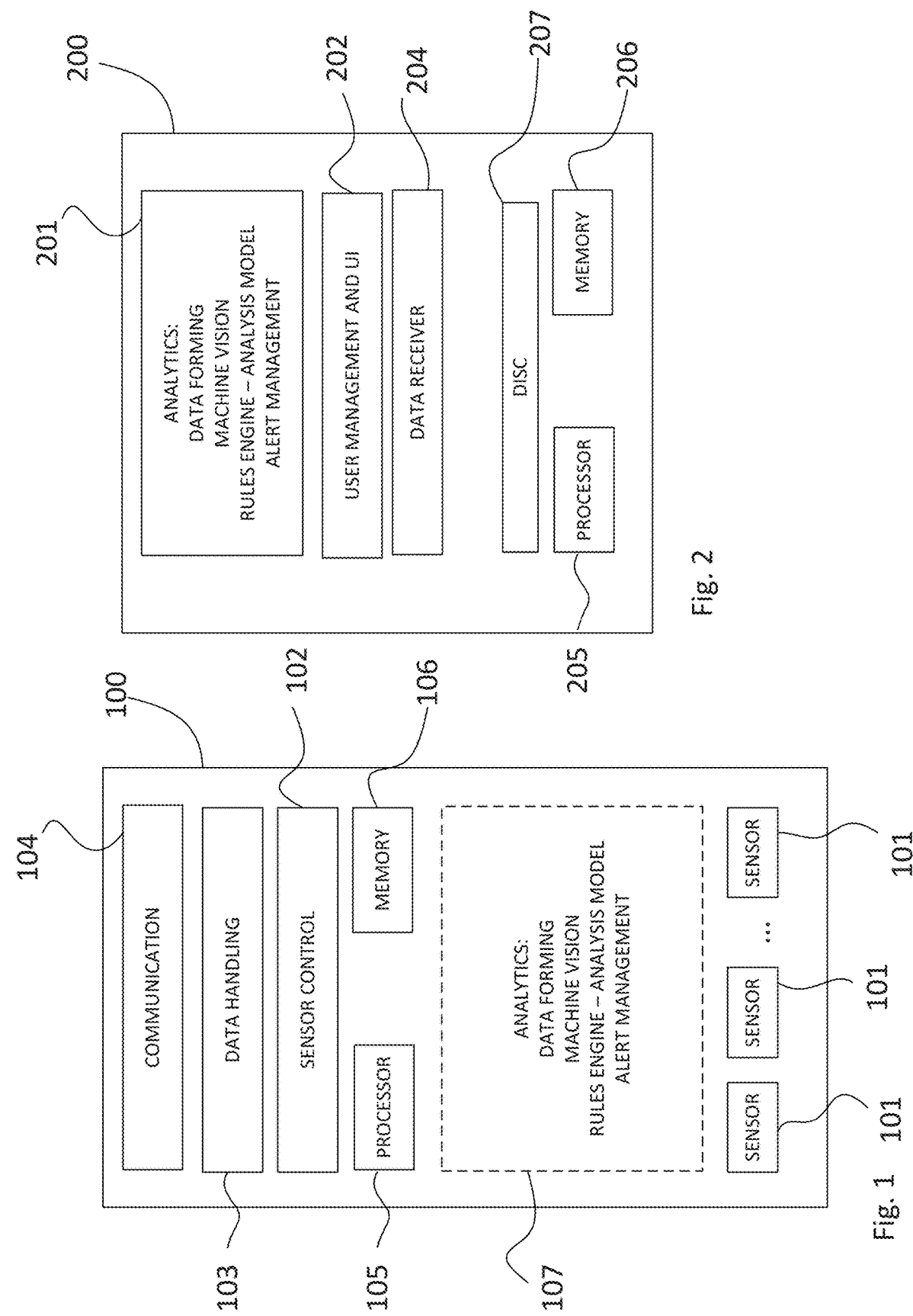

| Rules | Conclusions | Recommendations with automatic actions |
|---|---|---|
| Example 1: Sudden change in oil quality trend AND Oil quality Alarm active AND Particle amount limit reached AND Particle size limit reached AND External impurities detected | Several internal and external impurities detected And large particles in oil detected | Launch automatic oil reconditioning filtering And check inline oil filters And change oil air breather |
| Example 2: Slow ascending of oil quality trend AND Oil quality Alarm not active AND Particle amount limit not reached AND Antioxidants low level limit reached | Antioxidants level too slow and no impurities detected | Launch automatic Antioxidants additives refill system |

Fig. 6

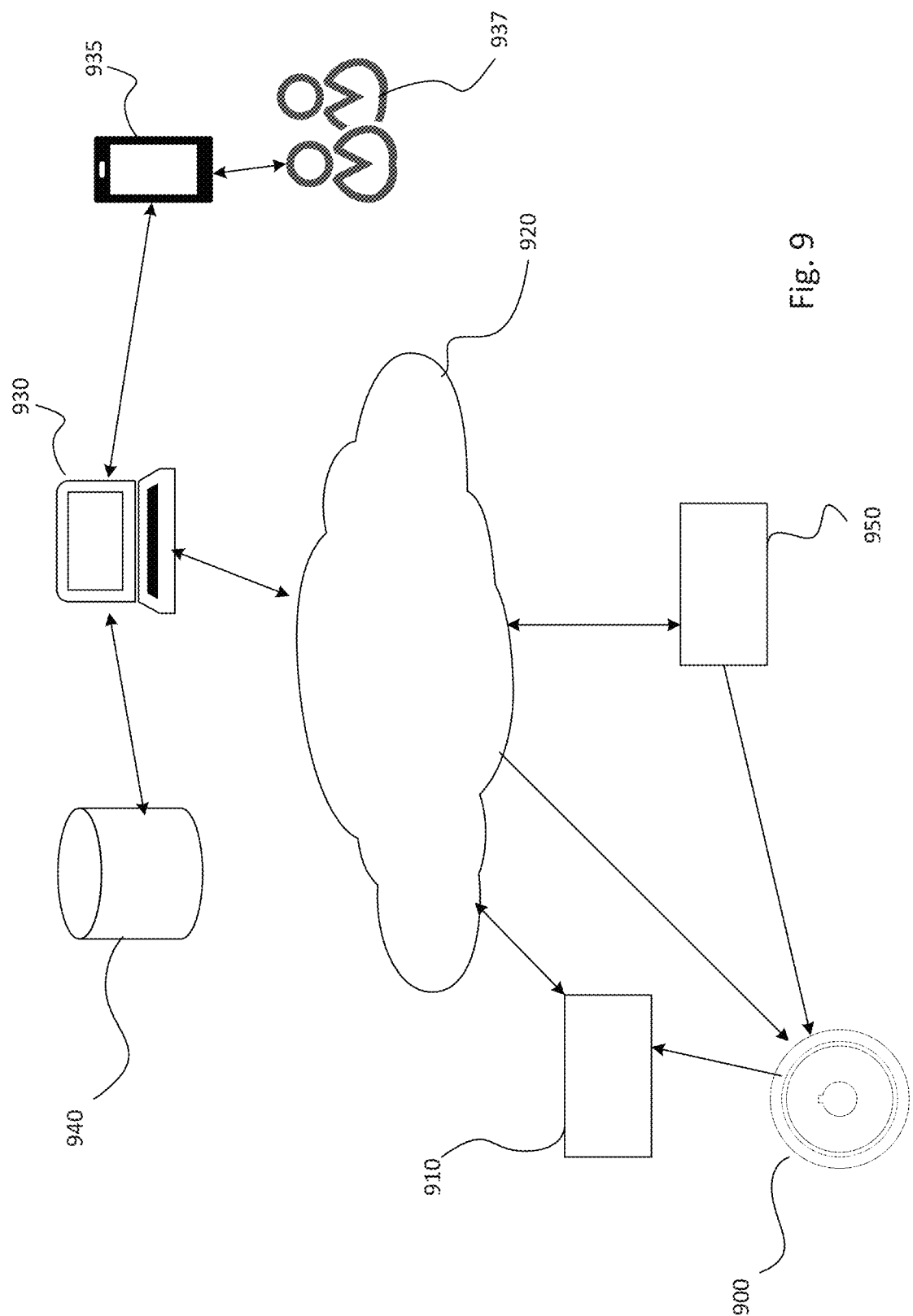

METHOD, AN APPARATUS, A SYSTEM, AND A COMPUTER PROGRAM PRODUCT FOR SUBSTANCE ANALYSIS

CROSS-REFERENCE TO RELATED APPLICATIONS

This application claims priority to co-pending Finnish Patent Application No. 20205894, filed on Sep. 16, 2020, the contents of which is incorporated herein by reference.

TECHNICAL FIELD

The present solution relates to a method and technical equipment for substance analytics suitable for being used in autonomous machine performance diagnostic and quality and operations control

BACKGROUND

In heavy industry and logistics sector, unexpected operational downtimes may cost hundreds of billions dollars each year. For example, more than half of the machine failures relate to oil in rotating machines and hydraulics units. Parallel to this, these industries consume over 40 M tons of new oil each year causing a massive stream of waste oils.

Very often the maintenance work is reactive or calendar-based. In the latter type of maintenance work, the procedure comprising the maintenance break, visual inspection, taking oil samples and laboratory tests is made at certain intervals, e.g. yearly. However, the samples that are used for analyzing e.g. oil, may be very tiny and are taken once a year. This may not indicate anomalies very well, especially those that appear regularly but are not visible at all times. In addition, the laboratory tests may take long, during which a failure mode could have escalated. If machine operator identifies anomalies between calendar-based maintenance breaks, the procedure comprising the visual inspection, taking oil samples, and laboratory tests is performed. Based on the laboratory results, needed actions are taken. However, it is clear that such a procedure takes time. In reactive maintenance work, the failure mode may have escalated to more critical level until it is noticed that something is wrong.

Since maintenance people is not aware on what to do when a potential failure mode starts escalating, there is a need for real-time analysis which identifies potential anomalies early, makes a root-cause analysis of escalating problem, and also tells the machine operator (e.g. a human, machine itself or external reconditioning unit) promptly how to tackle the forthcoming problem. Therefore, there is a need for a system that is capable of automatically analyzing any substance appearing in a machine, and giving commands to the machine operator (e.g. human, machine itself or external reconditioning unit) based on the analysis in real-time. The present solution is targeted to such a need.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus, a system and a computer readable medium comprising a computer program stored therein, which are characterized by what is stated in the independent claims. Various embodiments are disclosed in the dependent claims.

According to a first aspect, there is provided a method comprising
  receiving a substance, said substance being obtained from a machine being inspected;
  detecting properties of the received substance by means of one or more sensors;
  transmitting information on the detected properties to an analytics module;
  performing an analysis on said detected properties according to predefined analysis rules;
  generating control instructions based on the analysis;
  providing the control instructions as an output.

According to a second aspect, there is provided a method comprising
  receiving information on properties, which properties have been detected by one or more sensors from a substance used by a machine being inspected;
  performing an analysis on said received properties according to predefined analysis rules;
  generating control instructions based on the analysis;
  providing the control instructions as an output, wherein the control instructions are used to control the machine being inspected.

According to a third aspect, there is provided an apparatus comprising at least the following:
  means for receiving information on properties, which properties have been detected by one or more sensors from a substance used by a machine being inspected;
  means for performing an analysis on said received properties according to predefined analysis rules;
  means for generating control instructions based on the analysis; and
  means for providing the control instructions as an output, wherein the control instructions are used to control the machine being inspected.

According to a fourth aspect, there is provided a system comprising at least a measurement unit and an analytics module, wherein
  said measurement unit is configured to receive a substance, said substance being obtained from the machine;
  said measurement unit comprises one or more sensors to detect one or more properties of the received substance;
  said measurement unit is configured to transmit information on the detected one or more properties to the analytics module;
  said analytics module is configured to perform an analysis on said one or more properties according to a predefined analysis rules;
  said analytics module is configured to generate control instructions based on the analysis; and
  said analytic module is configured to provide the control instructions as an output, wherein the control instructions are used to control the machine being inspected.

According to a fifth aspect, there is provided a computer program product comprising computer program code configured to, when executed on at least one processor, cause an apparatus or a system to:
  receive information on properties, which properties have been detected by one or more sensors from a substance used by a machine being inspected;
  perform an analysis on said received properties according to predefined analysis rules;
  generate control instructions based on the analysis; and provide the control instructions as an output, wherein the control instructions are used to control the machine being inspected.

According to an embodiment, the analytics module is located in a cloud server, whereupon the measurement unit comprises a data transfer connection with said analytics module.

According to an embodiment, the measurement unit is coupled to the machine.

According to an embodiment, the substance is fluid or gas.

According to an embodiment, the measurement unit is configured to make a preliminary analysis based on the detected properties.

According to an embodiment, said analytics module is configured to receive results on a preliminary analysis made at a measurement unit, and to use the preliminary analysis to performs the analysis.

According to an embodiment, the measurement unit is configured to transform the detected data into a quantitative format.

According to an embodiment, said control instructions are used for repairing the external device either automatically or manually.

According to an embodiment, the system comprises a reconditioning unit for receiving said control instructions and for repairing the machine according to said control instructions.

DESCRIPTION OF THE DRAWINGS

In the following, various embodiments will be described in more detail with reference to the appended drawings, in which FIG. 1 shows an example of a measurement unit;

FIG. 2 shows an example of a data management unit;

FIG. 6 shows two examples of automatic machine-to-machine control; and

FIG. 9 shows a simplified example of a system according to an embodiment.

DESCRIPTION OF EXAMPLE EMBODIMENTS

Figure 3:
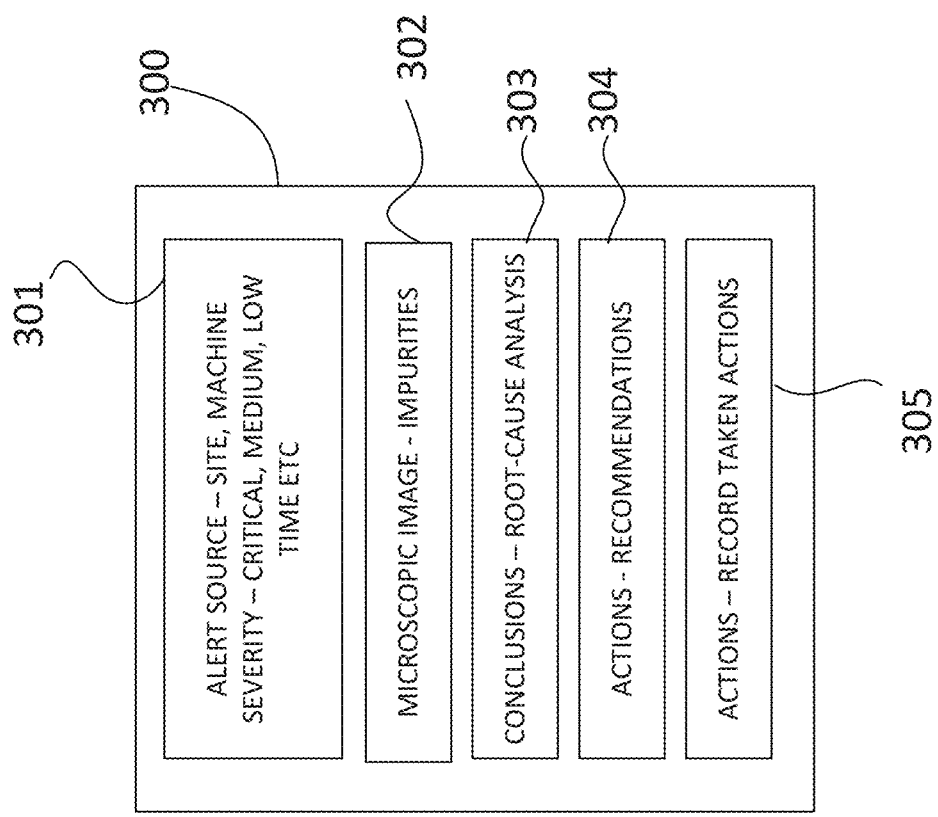
FIG. 3 shows an example of a user interface.

In the following, several embodiments will be described in the context of machinery in heavy industry and/or logistics sector. It is however appreciated that any other sector's machine/device having fluids inside or utilizing some part of fluids properties internally or externally benefits from the present solution. The fluid may be oil for lubricating, for flushing the machine, for shifting power (e.g. hydraulics), for insulating (e.g. in transformers), for heat transfer/cooling (e.g. machine connected to cooling circulation), for heating or cooking, for keeping a machine or process clean (e.g. solvents). In addition, the fluid may be a coolant, such as glycol or glycol water mixture. The fluid may also be water or purified water, or a solvent, e.g. alcohol-based solvent to flush a system. It is appreciated that the previous lists disclosing examples of a fluid are given for understanding purposes only. Thus, the fluid being analyzed can also be something that was not disclosed. It is appreciated that even in a food production similar monitoring can be applied. For example, in dairies the quality control of a milk could benefit from the present solution. In addition to fluids, in some cases, the substance being measured may be gas or air or a solid substance.

Various fluids have more or less similar chemical properties, and ways how these properties function. In addition, several similar phenomena can be detected e.g. in oil—regardless of the use case. For example, oil inside an industrial machine can be monitored to detect impurities, whereupon these impurities can be filtered, or the oil can get oxidized or get old too quickly, whereupon the oil needs to be changed. Similar process can be seen in a food processing industry or a fast-food restaurant in relation to deep fryers. Industrial fluids work properly, when there are no impurities and no changes in their chemical structure. However, it is evident that the chemical structure of a substance will change over time, and impurities and chemical changes will appear to the substance during the process.

Thus the present embodiments provide a solution to measure purity and/or chemical composition and/or performance of a substance, e.g. liquid (or fluid) or a gas, online with various monitoring methods. In addition, the solution is able to combine data from external sources to make intelligent root-cause analysis, and to make autonomous analysis and action recommendations to a human (e.g. an operator of the machine) or machine itself (self-aware machine) or any other external device (e.g. reconditioning unit).

The present embodiments provide a solution by means of which anomalies of a substance are seen; the substance is analyzed in an intelligent manner; and conclusions/recommendations made based on the analysis are output. Thus, the present embodiments provide a solution by means of which real-time analysis of a substance is enabled, and by means of which specific commands in e.g. written/spoken format are given. In addition—or instead—of human-understandable format for commands, also machine-readable commands can be provided. The specific commands may relate to alert, criticality, reason for the alert, conclusions, actions points for mitigating the potential failure event or some other relevant/critical data point.

The present solution comprises at least a measurement unit and a data management unit, which are discussed in more detailed manner in the following.

FIG. 1 illustrates an example of a measurement unit 100. The measurement unit comprises a variety of sensors 101 being configured to detect specific properties of a substance. The substance is received by the measurement unit 100 as an input. According to an embodiment, the substance flows through the measurement unit via tubes and enters to a container within the measurement unit. Alternatively, the substance may be injected to the measurement unit from a sample bottle. According to yet another embodiment, the measurement unit comprises a motor which is configured to pump the sample at least from a container of the machine but in some embodiment, also back to the container of the machine. Any of these examples can be controlled remotely.

The sensors 101 may measure the substance during the flow in real-time. Alternatively, the sensors 101 can operate sample-based daily/weekly/etc. The sensors 101 can comprise a conductivity/capacitivity sensor, a microscopic camera, an optical sensor, an infrared sensor, a spectral sensor, a temperature sensor, a pressure sensor—to mention few as examples. In addition, the measurement unit 100 may comprise an external sensor (not shown in FIG. 1) outside the measurement unit 100 to monitor the environment. While the internal sensors 101 are configured to measure properties of the substance within the machine, the external sensor may measure temperature of the environment, the humidity, the dust in the air, etc., surrounding the machine.

The conductivity/capacitivity sensor is capable of detecting whether the substance being analyzed has changed with respect to conductivity/capacitance, which may indicate deterioration of a sample. This further indicates a poor quality of the substance. A microscope can be used to detect various particles and their amount within the substance, and also to capture a picture on the particles being analyses for later use. An optical sensor or an infrared sensor is capable of detecting chemical properties, such as oxidation, water, additives, nitration, sulfation, phosphate, TAN/TBN values (Total Acid Number/Total Base Number) to name a few. In addition, glycol concentration and pH level, and many other chemical properties, can be measured.

The measurement unit 100 also comprises a sensor control module 102 and data handling module 103, which are part of a software for edge computing. The modules 102, 103 are configured to manage the connected sensors and their data locally, i.e. by reading data, handling and preprocessing/prescreening the sensor data and preparing relevant pre-analyzed data and sending the relevant data to the data management unit for further analysis.

The prescreening may comprise determining whether or not sensor data already exceed a certain threshold, which would indicate anomalies in the substance. Such a detection may be internally alerted in the system, i.e. to a data management unit (FIG. 2) comprising the analytics module (FIG. 2: 201). In addition, by measuring certain values, it is possible to determine the quality of the measurement and to validate that the measurement is working correctly. At this point, data from the external sensor may be used to determine whether any environmental factors affect to the quality of the substance.

Pre-analysis of a data refers to a processing of data so that the data that is to be transmitted to the data management unit comprises more information than mere raw data. This means that even though sensor data is read in continuous manner, the sensor data is not transmitted to the analytics unit at same frequency. The sensor data is processed, and only the relevant data is sent to the data management unit. The prescreening and pre-analysis may be implemented by using a machine learning algorithm, which receives sensor data (internal sensors and external sensors) as input and outputs a determination on the relevant data. As a simple example, the machine learning algorithm receives an image of an oil flow, whereupon the machine learning algorithm is configured to determine from the image whether the oil is clean or whether the oil comprises particles. Thus, the relevant data to be send for further analysis would be the information on the determination, i.e. oil is clean or oil comprises particles, instead of the image.

The measurement unit 100 also comprises a communication gateway 104 to be used for transferring data to the data management unit. The communication can be implemented according to any known data transfer protocol over network, such as wireless short or long range communication network or wired communication network. It is appreciated that the measurement unit 100 may communicate—not only with the data management unit—but also any other device capable of wireless or wired communication. The data to be transferred for further analysis comprises at least the sensor data which is preferably pre-analyzed and/or preprocessed and thus relevant, but may also contain, internal alerts being created, validation and control data of the measurement. In addition, the communication gateway can be used to command and control the measurement unit 100 from the data management unit (shown in FIG. 2). For example, the data management unit may send commands to the measurement unit 100 to start up or to shut down, to take a sample, to perform the measurement, to update profiles, etc.

The measurement unit 100 also comprises a processor 105 and a memory 106. The memory 106 stores a computer program code, which—when executed by the processor 105—causes the measurement unit to perform its functionalities as discussed above.

FIG. 2 illustrates an example of an data management unit 200. The main module of the data management unit 200 is the analytics module 201 that is configured to analyze the data being received via data receiver 204 from the measurement unit 100. In addition, the data receiver 204 is capable of receiving other data concerning laboratory tests or data from other machines to be fused with the data from the sensors, thus complementing the analysis. In addition, the data receiver is capable of receiving other data comprising data that has been gathered from other machines, from other maintenance systems, from a monitoring system, other sensors to be fused with the data from the sensors, thus complementing the analysis. All the external industrial data from other systems or machines or environments or substances can be obtained from corresponding data sources, or from a database storing such data.

The analytics module 201 comprises elements for gathering the data and modifying the data having various formats into a quantitative format, by means of which the data from various sensors is made comparable. For example, an image from the microscopic camera is converted into a format, according to which it is comparable with data received from e.g. conductivity sensor.

The analytics module 201 also comprises analytics engine for intelligent analysis for the data. For example, if the conductivity sensor indicates that the conductivity has been changed slightly, and the microscopic camera has indicated that the image comprises particles of a certain amount and size in the sample, the analytics engine may conclude that the sample comprises metal particles after verification by the machine vision from the sample picture. The rules for the analytics engine are created based on knowledge and experience, and can be complemented with data from previous events (this feature is discussed in more detailed manner later with reference to "feedback loop"), with algorithms providing artificial intelligence (e.g. deep learning, unsupervised learning that detects anomalies/patterns that a human cannot find). Thus the rules can be generated and/or updated according to an output of a machine learning algorithm that is continuously trained by observations and new measurement data gathered from sensors during a new measurement process after a repair or as a result of a reconditioning unit (discussed later). In addition, the analytics module 201 is able to make a detailed root-cause analysis that will answer questions on what has happened and why, and how to mitigate the risk. The root-cause analysis can be based on real-time or temporal correlation analysis. As a result of this analysis, recommended actions can be selected and generated automatically based on the root-causes of each possible divergence being analyzed. In addition, the analytics module 201 may be in charge for alert management. The data management unit 200 may also comprise a data server and a user interface server, and also modules for user management 202.

The data management unit 200 also comprises a processor 205 and a memory 206. The memory 206 stores a computer program code, which—when executed by the processor 205—causes the data management unit to perform its functionalities as discussed above. In addition, the data management unit 200 comprises a disc space 207 or data space for storing long-term data. The disc space 207 is used to store data from various machines; various sensors; various environmental factors, which have been gathered from various measurement events for a long-lasting period. This data can be used to continuously train the machine learning algorithm of the analytics engine.

The results of the analysis can be displayed on a user interface of a web site, or on a user interface of a specific analysis software. In addition, any alert being caused from the analysis may be sent as an alert message to recipient's email or short/instant message or in any other format. FIG. 3 illustrates an example of content of a user interface 300 being shown on a web site or on a specific analysis software. The data concerning the user interface 300 may be stored in the data management unit of FIG. 2. The user interface 300 is used to indicate whether an alert 301 has occurred, and the severity of the alert. In addition, the user interface 300 may display microscopic images on the examined substance. In addition, the user interface 300 display conclusions 303 and provide recommended actions 304 resulting from the analysis either in spoken or written format. A human operator—after having noticed the recommended action—may perform the recommended action for repairing the machine. Such a taken action may be recorded 305 and stored in the system. Such recorded actions may be viewed later on the user interface thus generating a closed-loop feedback system. Such a closed-loop feedback system comprises generating a recommendation, performing an action based on the recommendation, and learning from a result the action causes.

The recommended action that is provided by the analytics engine of the data management unit can be transformed into a control signal, which is forwarded directly from the data management unit to the machine being inspected, i.e. "target machine" or to a remotely operated maintenance unit, i.e. reconditioning unit. Such an operation may request confirmation from a user on a user interface 300. The target machine can use the control signal to adjust its functionality so that its operation, process or end-product quality may be improved. After the adjustment, the quality of the substance may be measured again in the measurement unit 100. This procedure expects that the target machine is able to receive data/commands from external sources, and has physical devices/mechanism installed for e.g. fluid performance management (e.g. purifying). In such an example, the analytics engine of data management unit 200 sends commands based on its analysis and controls the machine and/or other machines that a linked to the target machine (e.g. maintenance system, resource planning, etc.) what to do. Based on these commands, the machine can be controlled to continue performing as earlier, reduce/increase power, shut-down operation, open a valve to start filtration, open a valve to insert chemical, e.g. oil additive, or some other activity that re-condition oil/fluid/substance performance during production or alternatively stops the machine to prevent a serious failure or a production quality failure. The pre-installed chemical can be an ampoule or some other format containing the needed chemical or substance. The data management unit 200 with the help of the measurement unit 100 is configured to do continuous analysis to see how specific commands and treatments work. Thus, the data management unit 200 can send information that controls quantity, mixture, time, volume, sequences of chemical additions etc., filtration and/or other reconditioning operation based on the real-time measured data (feedback loop). The data management unit 200 can also send new commands to increase or decrease level of reconditioning activity (feedback loop). Once the substance performance is back to the required level, this command loop may be terminated and closed. It is appreciated that the information obtained from the reconditioning activity can be used for training the machine learning algorithm.

As said, one possible target for the control signal can be a reconditioning unit. The reconditioning unit can have been installed to the target machine, e.g. in the middle of an oil flow or some other suitable location. The purpose of the reconditioning unit is to automatically perform necessary actions e.g. to purify the substance. The reconditioning unit can perform the same reconditioning activity, which was discussed in the context of the target machine above, but the reconditioning unit can also be controlled to perform other operations, e.g. filtering of the substance, water removal, insertion of additives to the substance etc. When the necessary actions for reconditioning the substance has been performed based on the analysis control signal, the substance can be measured at the measurement unit 100 again, to detect how the purifying operations have affected the quality of the substance. With this information, the analytics module (FIG. 2; 201) can be updated to provide improved analysis and rules, and more specified alerts and recommendations. By this, a feedback loop is created between the analytics system and the machine being inspected to continue real-time monitoring. Once the substance performance is back to required level, the command loop may be terminated and closed.

In previous, various elements composing the analysis system have been described. The various elements have been illustrated as separate units. However, one or more of the elements can be located on a same physical device. For example, an apparatus acting as the measurement unit shown in FIG. 1 can contain the analytics module as shown with respect to FIG. 2. This has been illustrated in FIG. 1 by an optional element 107. On the other hand, the data management unit of FIG. 2 can be located in a cloud or in an external server device being connected to the measurement unit over a network. Yet, as a further alternative, the data management unit of FIG. 2 or an analytics module of the data management unit can be a fixed part of a reconditioning unit. Yet, as a further alternative, the data management unit, the measurement unit and the reconditioning unit can form an entity. The user interface of FIG. 3 can be provided as a user interface to the data management unit of FIG. 2 through a separate client software or as a web page. Thus, the device by means of which the user interface can be accessed may be any computing device used by a human operator. Alternatively, the user interface is a user interface of a device that comprises at least analytics module, which device is used by the human operator.

The apparatus comprising the measurement unit of FIG. 1 is may be removably connected to the target machine (i.e. the machine to be inspected), for example to the bypass hose/tube, from which a substance sample can be obtained. It is appreciated that the measurement unit can be a "plug and play"—type of a device. Plug and play enables an easy installation or connection to the machine to be inspected to obtain a sample from the machine or to receive a sample flow.

Figure 4:
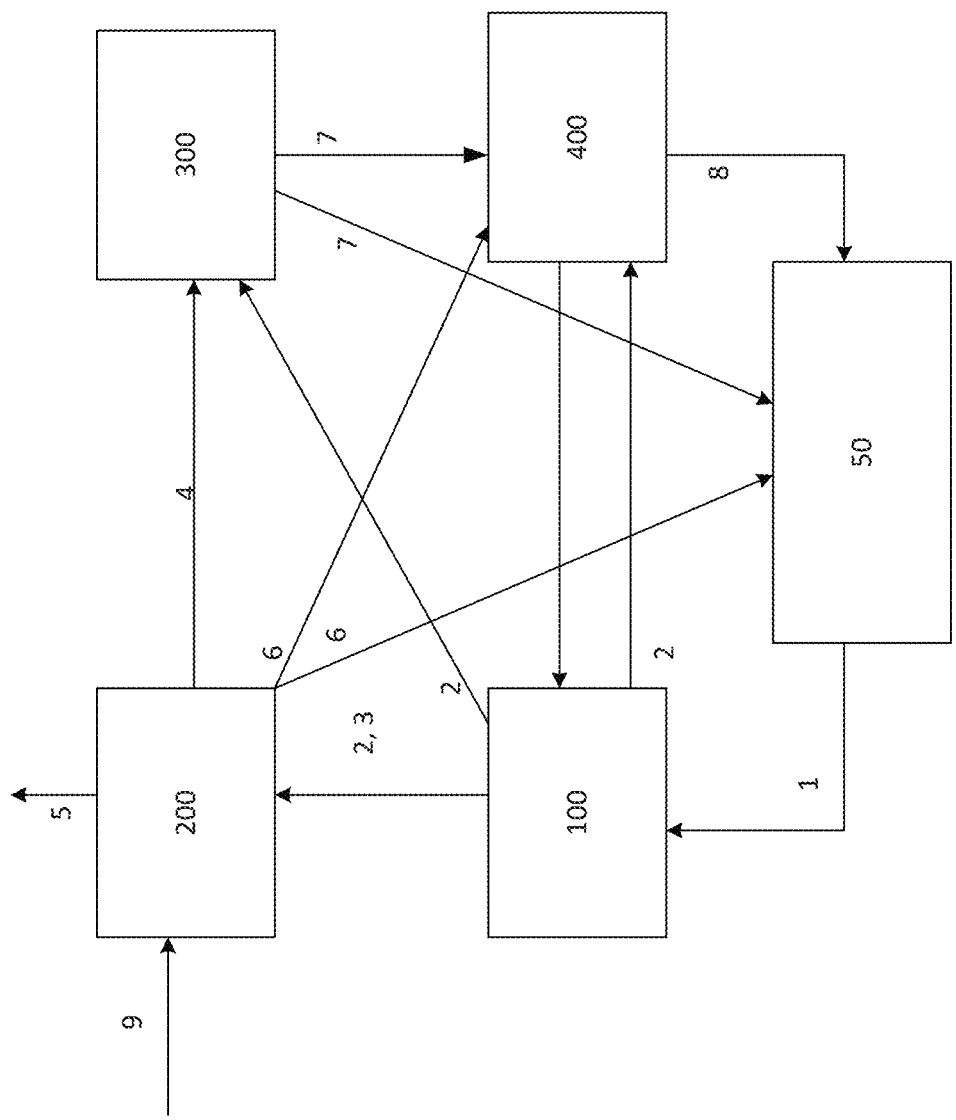
FIG. 4 shows an example of the interoperability between different units of the system.

FIG. 4 illustrates an example of the interoperability between various units. FIG. 4 shows a target machine 50. The target machine 50 can be a gearbox, a pump, a compressor, a hydraulic system, a cooling solution, material handling equipment, a lubrication system, a roller, a water turbine, a wind turbine, an injection molding system, a steel production machine, a food processing machine, a cooking/heating system using oil or other fluids, a cooling system using coolants (e.g. water, glycol), crane, stacker, ship engine, ship gearbox, etc. The target machine 50 may have a bypass hose/tube, to which a measurement unit 100 is connected in order to obtain the substance 1. Alternatively, the substance 1 being measured is taken out in other way, and entered to the inlet of the measurement unit 100.

The measurement unit 100 performs the measurement as discussed with reference to FIG. 1. If the measurement provides a prompt result on the measurement, this result 2 may be displayed on a user on a user interface 300. Alternatively, the result 2 may be communicated to the a data management unit 200 in order to be further analyzed and/or for alert creation. The result 2 may also be communicated to a reconditioning unit 400.

However, in its simplest form, the measurement unit 100 may only measure data on the substance, and transmit such data 3 to the data management unit 200 for detailed analysis. According to an embodiment, the measurement unit 100 may also transform the measured data into a comparable format. According to another embodiment, the data management unit 200 may transform the received data into a comparable, quantitative format.

The data management unit 200 is configured to perform the analysis by means of the analytics engine, as has been described with reference to FIG. 2. The data management unit 200 may receive data 9 relating to other laboratory tests or to the machine 50, which data may be used for complementing the analysis of the data 3 from the measurement unit 100. The result of the analysis, recommendations, alerts and detailed data concerning the results from any of the sensors is provided as a data 4 to be shown on a user interface 300. It is appreciated that depending on the use case, the data being provided to be shown on a user display may vary from what was listed in the previous sentence. The user interface 300 displays the data and outputs the recommendation in spoken format, in written format, in visual format, in machine language, etc.

The data management unit 200 may also transmit the alerts 5 as an email, short message, instant message, etc. to a user. According to yet another embodiment, the data management unit 200 may create a control signal 6 based on the recommended actions and transmit the control signal to a reconditioning unit 400, or to the machine 50 itself.

The user interface 300 is configured to display the results, recommendation, alerts etc. to user, and receive user inputs in the form of selections. The user interface 300 can also be used to control a reconditioning unit 400. For example, the user may specify on the user interface, which of the recommended actions are put in use at the reconditioning unit 400, or the user may confirm that a certain automatic action can be done on the machine 50. These actions are converted into a control signal 7, by means of which the reconditioning unit 400 can be controlled or the machine 50 can be adjusted. When the control signal 7 is for the reconditioning unit 400, the reconditioning unit 400 is able to perform the necessary operations 8.

Figure 5:
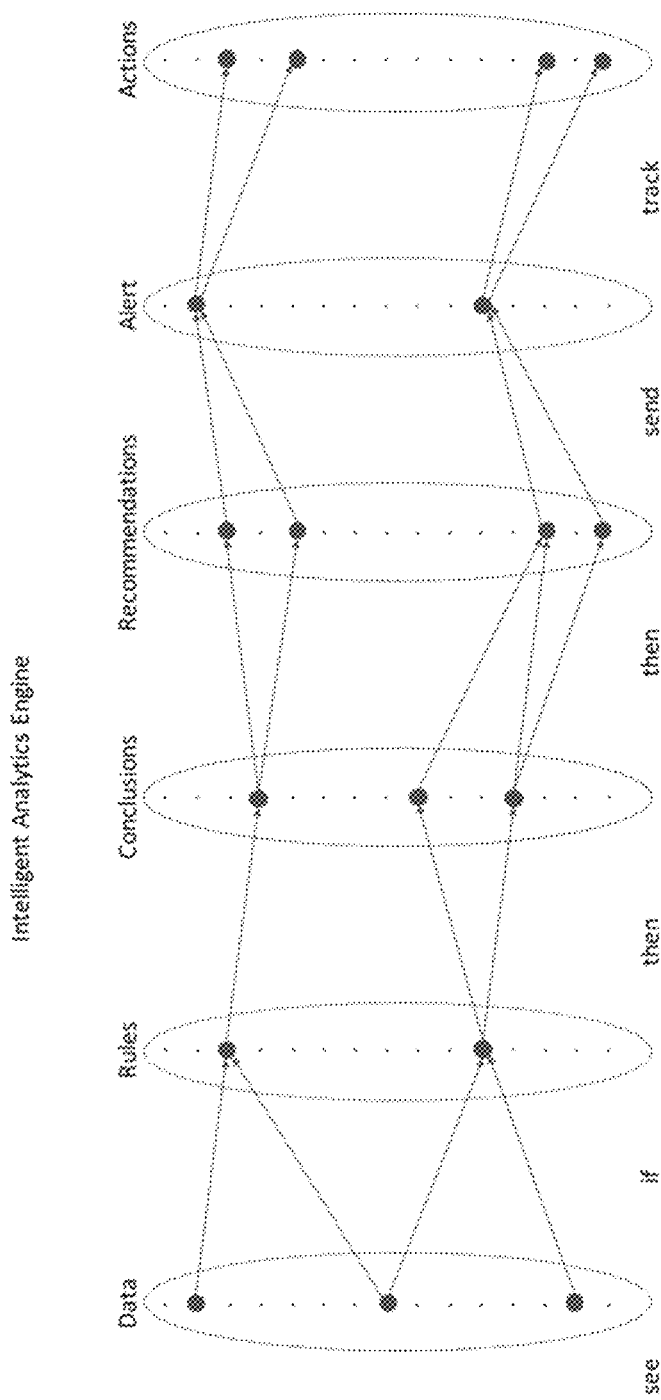
FIG. 5 shows an example of a logic of an analytics engine.

FIG. 5 shows a simplified example of an operation model of the analytics engine of the data management unit 200 (FIG. 2). The operation of engine is based on a 'data' that has been measured by the measurement unit (FIG. 1). If the combination of the data fulfils certain rule/'rules', respective 'conclusion(s)' can be made. The made conclusions control the selection of 'recommendations', which in turn causes 'alert(s)' to be send and further 'actions' to be tracked.

The rules can comprise, e.g. trends, tests and alarms, which—if met—causes certain conclusions. For example, when analyzing trends, it is determined whether the sample has sudden change, whether the sample's measured data is rising/falling or ascending/descending. On the other hand, when analyzing tests, it is determined whether or not the sample causes alarms, and how soon, and when analyzing alarms, it is determined which of the measured data (temperature, sample quality, particle amount, pressure, etc.) of the sample causes an alarm.

The conclusion that is made based on the rules may contain determining that that sample comprises impurities, such as several large particles. Sample's impurity may thus be concluded according to one or more of the following: a number of particles, a size of the particles, type of the particle (metal, sand, water), etc. On the other hand, conclusions based on chemical measurement can be made, for example, whether the sample has chemical changes, viscosity changes, whether antioxidant or TBN is low, whether the sample comprises water or sand, etc. Other conclusions being made may comprise one or more of the following: filter is broken, cooler is broken, workload has changed, cavitation, etc. These phenomena need to be identified in order to prevent false alarms. It is appreciated that the conclusion being made based on rules may not contain only one conclusion, but may contain several conclusions.

Based on the conclusions, the analytics engine is capable of generating recommendations. Few examples on recommendations are listed in the following: cleanliness analysis, laboratory analysis, check inline filters, apply offline filtering, remove soot, refill TBN additive, check ventilation and breathers, top-up oil, refill antioxidants additive, thermal imaging, vibrations analysis, tank cleaning, flushing, apply water removal, etc. Again, depending on the case, the recommendations may contain one or more actions that are recommended for the operator.

An alert is then generated based on the recommendations. An example of the is given below, and it can contain the following information:
   Particle amount>50 or largest particle>80
   Site: Laboratory123
   Machine: DeviceX
   Measure point: Lubrication
   Status: Noticed
   Time: yyyy-mm-dd
   Severity: MEDIUM
   Warnings:
     Problem: largest_particle: 80.0
     Problem: bounding_boxes: 59.0
   Conclusions:
     impurities
   Actions:
     Cleanliness analysis
     Check inline oil filters
   Impurity level has increased slightly.
   History:
     LaboratoryXYZ Noticed
     Laboratory123 Pending Actions:
       Check inline oil filters The rules, recommendations, alerts, actions and other potential/needed parameters can be predefined manually, but can be generated according to self-learning algorithms based e.g. on tracked actions, and the effect such action has.

It is appreciated that the operation model of the analytics engine, shown in FIG. 5, can be implemented for example as a neural network model, a decision tree model, a regression analysis, wherein the data is received as an input and any one or more of the following is provided as an output: a conclusion; a recommendation; an alert; an action.

The a data management unit 200 is also configured to make analysis based on time. As an example of such function, an average lubrication cycle is described. It is known, that fluid/oil is not homogenous, and chemical composition and impurities may vary along the oil flow. Therefore, the data management unit 200 is configured to analyze the fluid performance in time (in addition to other variables). A lubrication cycle is a term referring to the time when the oil has flown around the system once. When lubrication cycles are analyzed, it is possible to evaluate if the anomaly is regular, escalating or fading. In addition, based on the analysis, it is possible to evaluate if the fluid is homogenous or not. The data management unit 200 is also configured to estimate where the problem is: in only a certain part of the oil or in whole oil. Based on this information, the data management unit 200 can create a model of anomaly starting point: did the anomaly start as "pulses" or as a steadily increasing trend development. The model of the starting point is important, since it enables making predictive conclusions and actions early. Pulses may indicate physical impurities, whereas the steady development indicates chemical changes. This information can be related to the ambient/atmosphere data (external impurities, temperature, air pressure, machine utilization information), whereupon the data management unit 200 may estimate if external factor is a reason for the detected anomaly.

With help of such time-based analysis, it is possible to control/guide the machine or external reconditioning machine. For example, if filtration can be applied in a pulsed manner, majority of the impurities may be captured with less filtering. In addition, the reconditioning occurs timely.

The solution as discussed above can be utilized by machines having oil as a lubricant, whereupon the use of the solution may contain the following steps, according to an embodiment. However it is appreciated that the oil is used here only as an example, but the substance can be any other:
- the measurement unit receives an oil sample, and uses one or more sensors to measure properties of the oil sample;
- the measurement unit transmits the measured data to an analytics unit;
- based on the measured data, which have been transformed into quantitative format either at the measurement unit or analytics unit, the analytics unit module
  - detects an anomaly in oil quality trend signal (spikes with increasing trend);
  - verifies that tiny fibers (size, quantity) can be seen in a microscopic view;
  - verifies that no changes has happened in chemical composition of oil;
  - verifies that surrounding atmosphere is clean of such impurities;
- the analytics unit performs an analysis based on this information, but also utilizing machine and oil information, factory specific information and previous laboratory data;
- the analytics unit sends an alert with action recommendations (email, short message, instant message, . . . ) to the operator of the machine or to the machine itself or to external oil reconditioning unit;
- recipient (i.e. human operator, the target machine, or the external reconditioning unit) of the message takes the needed actions to mitigate the potential risk, e.g. by starting filtration;
- the system monitors the development and once targeted cleanliness level has been achieved the case is closed and documented in the case history.

FIG. 6 illustrates two examples of automatic machine-to-machine (M2M) control. In Example 1 any data sample that matches to Rule "Sudden change in oil quality trend" AND "Oil quality Alarm active" AND "Particle amount limit reached" AND "Particle size limit reached" AND "External impurities detected" causes a conclusion that there are several internal and external impurities and large particles in the oil sample. It is then determined that the recommendation with automatic action is "launch automatic oil reconditioning filtering and check inline oil filters and change oil air breather". Such an action is signaled from the data management unit to a reconditioning unit or to the machine being inspected by using any suitable machine-to-machine communication technology.

In Example 2 any data sample that matches to Rule "Slow ascending of oil quality trend" AND "Oil quality Alarm not active" AND "Particle amount limit not reached" AND "Antioxidants low level limit reached" causes a conclusion that the antioxidants level is too low and no impurities were detected. It is then determined that the recommendation with an automatic action is "launch automatic antioxidants additives refill system". Such an action is signaled from the data management unit to a reconditioning unit or to a machine being inspected by using any suitable machine-to-machine communication technology.

Figure 7:
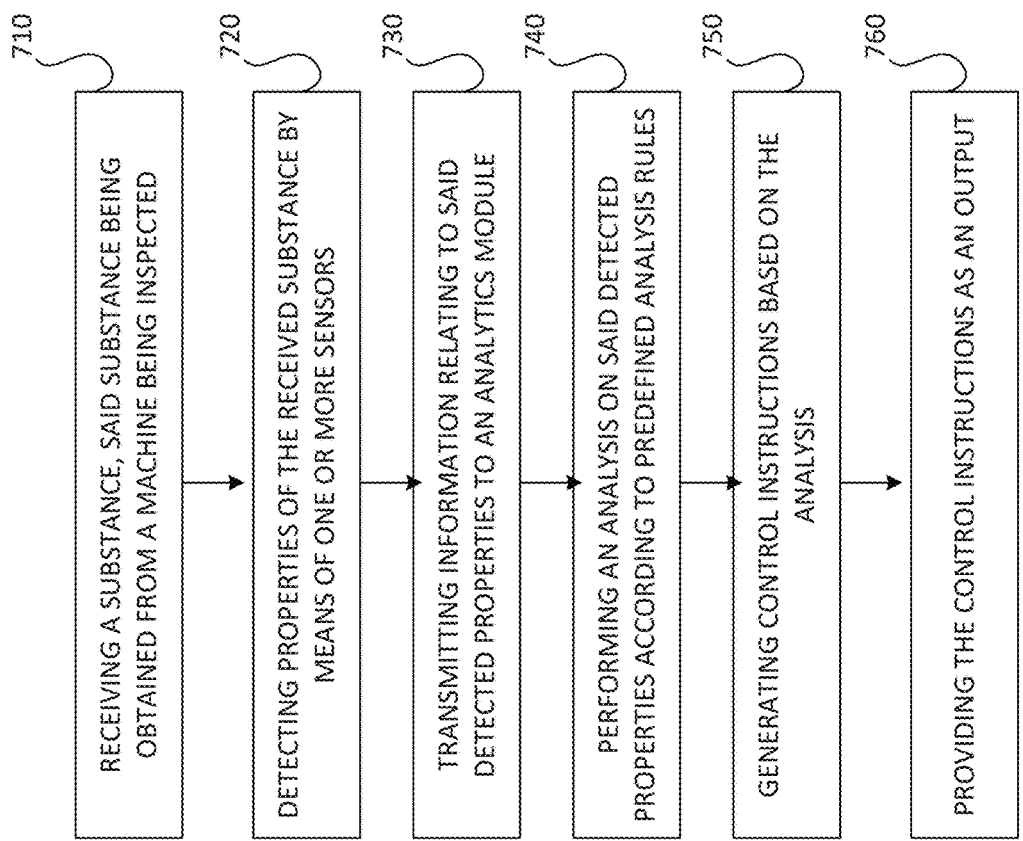
FIG. 7 is a flowchart illustrating a method according to an embodiment.

The method according to an embodiment is shown in FIG. 7. The method generally comprises receiving 710 a substance, said substance being obtained from a machine being inspected; detecting 720 properties of the received substance by means of one or more sensors; transmitting 730 information on the detected properties to an analytics module; performing 740 an analysis on said detected properties according to predefined analysis rules; generating 750 control instructions based on the analysis; and providing 760 the control instructions as an output. Each of the steps can be implemented by a respective module of a computer system.

An apparatus according to an embodiment comprises means for receiving a substance, said substance being obtained from a machine being inspected; means for detecting properties of the received substance by means of one or more sensors; means for transmitting information on the detected properties to an analytics module; means for performing a analysis on said detected properties according to predefined analysis rules; means for generating control instructions based on the analysis; and means for providing the control instructions as an output. The means comprises at least one processor, and a memory including a computer program code, wherein the processor may further comprise processor circuitry. The memory and the computer program code are configured to, with the at least one processor, cause the apparatus to perform the method of FIG. 7 according to various embodiments.

Figure 8:
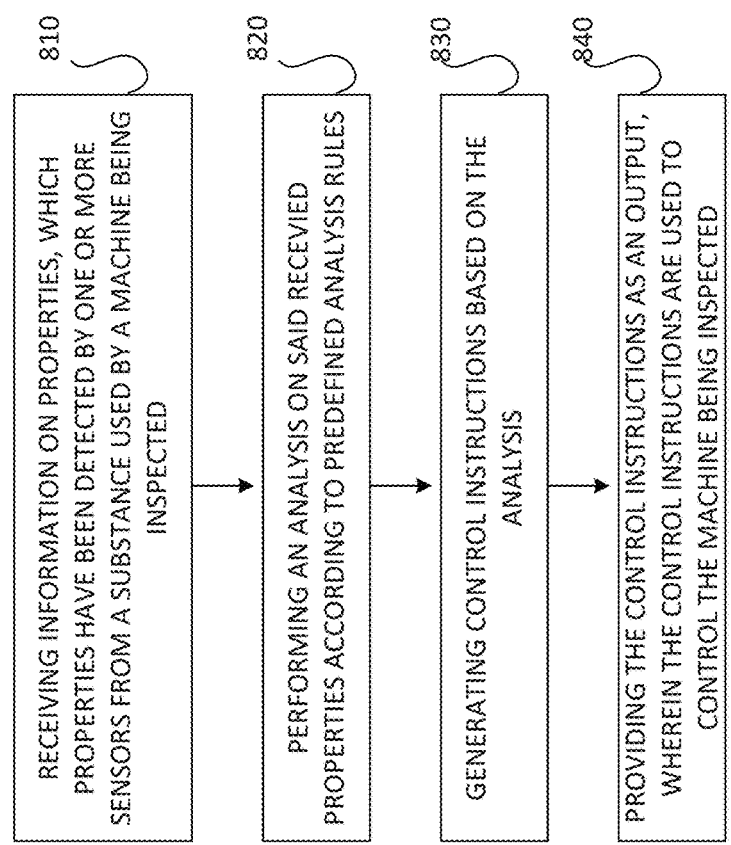
FIG. 8 is a flowchart illustrating a method according to another embodiment.

The method according to another embodiment is shown in FIG. 8. The method generally comprises receiving 810 information on properties, which properties have been detected by one or more sensors from a substance used by a machine being inspected; performing 820 an analysis on said received properties according to predefined analysis rules; generating 830 control instructions based on the analysis; and providing 840 the control instructions as an output, wherein the control instructions are used to control the machine being inspected. Each of the steps can be implemented by a respective module of a computer system.

An apparatus according to an embodiment comprises means for receiving information on properties, which properties have been detected by one or more sensors from a substance used by a machine being inspected; means for performing an analysis on said received properties according to predefined analysis rules; means for generating control instructions based on the analysis; and means for providing the control instructions as an output, wherein the control instructions are used to control the machine being inspected. Each of the steps can be implemented by a respective module of a computer system. The means comprises at least one processor, and a memory including a computer program code, wherein the processor may further comprise processor circuitry. The memory and the computer program code are configured to, with the at least one processor, cause the apparatus to perform the method of FIG. 8 according to various embodiments.

FIG. 9 illustrates yet another embodiment of a system for performing an analysis of an substance. The substance being analyzed is taken from a machine 900 to a measurement unit 910. The measurement unit 910 comprises sensors for analyzing properties of the substance, and optionally performing a pre-analysis of the properties. The data (e.g. measured properties, result of the pre-analysis) is transmitted over a network 920 to a data management unit 930 which performs detailed analysis of the data by means of the machine learning algorithm. The data is stored to a database 940. In addition to the received data, the data management unit 930 may use other data from the database 940 to complement the analysis. Examples of the other data comprises: data that has been gathered from other machines, from other maintenance systems, from a monitoring system, other sensors. The result of the detailed analysis, as well as recommended actions are show on a user interface. The user interface can be provided on the data management unit 930 or to a client device 935 of users 937. The recommended actions are also communicated directly to the machine 900, or to a reconditioning unit 950, which is configured to perform said received actions in the machine 900.

In above, a solution for autonomous machine performance diagnostics has been described. The system being disclosed is able to monitor e.g. oil flow continuously, and when the system identifies an anomaly, it sends an internal warning in the system. The analytics module is configured to verify if any other warnings are present or anomalies that indicate problems. Based on this information, the system is capable of creating a root-cause analysis and sending action recommendations along with relevant data. The data may not be from all aspects as detailed as laboratory data (e.g. elementary analysis), but detailed enough to understand chemical and cleanliness changes in the oil (or other substance). Average lead-time to this alert is from seconds to minutes depending on the severity of the problem.

Compared to the solutions that exist in the technical field, the present embodiments has advantages. For example, the present solution may cut oil streams to half and prevent unexpected operational downtimes cost effectively. The present embodiments provide real-time analysis, whereupon the results are ready substantially immediately. The present embodiments also provide continuous oil performance information instead of once a quarter/year.

Due to the real-time inspection, the present embodiments provide very early indication of potential problem. In addition, the present embodiments enable longer lifespan for a substance, e.g. an oil, since the substance can be purified instead of changing it in a machine.

The solution has been described by means of various embodiments and examples. If desired, the different functions discussed therein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

The invention claimed is:

1. A method for substance analysis in machine performance diagnostic, comprising:
   receiving a substance sample of a fluid or of a liquid by a measurement unit, said substance sample being obtained from a machine being inspected to which the measurement unit is removably connected and through which the fluid or the liquid flows;
   detecting properties of the received substance sample by means of a variety of sensors of
   the measurement unit;
      repeating the receiving and the detecting over a fluid or liquid cycle the substance flows
   through the machine once;
      preprocessing the detected properties to determine relevant data;
   transmitting the determined relevant data to an analytics module of a data management unit;
   performing an analysis on said relevant data according to predefined analysis rules or a machine learning algorithm by the data management unit;
   generating control instructions based on the analysis; and
   providing the control instructions as an output.

2. An apparatus comprising at least one processor, and a memory
   including a computer program code, wherein the memory and the computer program code are configured to, with the at least one processor, cause the apparatus to receive a substance sample of a fluid or of a liquid from a machine being inspected through which the fluid or the liquid flows;
   detect properties of the received substance sample by means of a variety of sensors;
      repeat the receiving and the detecting over a fluid or liquid cycle the substance flows through the machine once;
   preprocess the detected properties to determine relevant data;
   transmit the relevant data on the detected properties over the cycle to an analytics module of
   the data management unit;
   wherein the analytics module is configured to perform an analysis on said detected
      properties according to predefined analysis rules or a machine learning algorithm;
   wherein the data management unit is configured to
   generate control instructions based on the analysis; and
      provide the control instructions as an output.

3. The apparatus according to claim 2, wherein the apparatus comprises an analytics module for performing the analysis.

4. The apparatus according to claim 2, wherein apparatus is configured to receive results on a preliminary analysis made at a measurement unit, and to use the preliminary analysis to performs the analysis.

5. A system for substance analysis in machine performance diagnostic, wherein the system comprises at least a measurement unit and an analytics module, wherein
said measurement unit is configured to receive a substance sample of a fluid or of a liquid, said substance sample being obtained from a machine being inspected to which the measurement unit is removably connected and through which the fluid or the liquid flows;
said measurement unit comprises a variety of sensors to detect properties of the received substance sample;
said measurement unit is configured to repeat the receiving and detecting over a fluid or liquid cycle the substance flows through the machine once;
said measurement unit is configured to preprocess the detected properties to determined relevant data;
said measurement unit is configured to transmit the relevant data to the analytics module;
said analytics module is configured to perform an analysis on said properties according to a predefined analysis rules or a machine learning algorithm;
said analytics module is configured to generate control instructions based on the detailed analysis; and
said analytic module is configured to provide the control instructions as an output.

6. The system according to claim 5, wherein the analytics module is located in a cloud server, whereupon the measurement unit comprises a data transfer connection with said analytics module.

7. The system according to claim 5, wherein the measurement unit is configured to make a preliminary analysis based on the detected properties.

8. The system according to claim 7, wherein said analytics module is configured to receive from the measurement unit results of the preliminary analysis, and to use the preliminary analysis to perform the analysis.

9. The system according to claim 5, wherein the measurement unit is configured to transform a detected data into a quantitative format.

10. The system according to claim 5, wherein said control instructions are used for repairing an external device either automatically or manually.

11. The system according to claim 5, further comprising a reconditioning unit for receiving said control instructions and for repairing the machine according to said control instructions.

12. A non-transitory computer program product comprising computer program code configured to, when executed on at least one processor of an apparatus or a system, cause the apparatus or the system to:
receive information on properties, which properties have been detected by a variety of sensors from a substance sample of a fluid or of a liquid that flows through a machine;
repeat the receiving over a fluid or liquid cycle the substance flows through the machine once;
preprocess the detected properties to determine relevant data;
transmit the determined relevant data to an analytics module of a data management unit;
perform an analysis on the relevant data according to predefined analysis rules or a machine learning algorithm;
generate control instructions based on the analysis; and
provide the control instructions as an output, wherein the control instructions are used to control the machine being inspected.

* * * * *